United States Patent [19]

Judzis et al.

[11] 4,059,380
[45] Nov. 22, 1977

[54] DEEP-DRAW THERMOFORMING OF THERMOPLASTIC SHEET

[75] Inventors: Arnis Judzis, Bedford Heights; Thomas J. Bond, Chardon, both of Ohio

[73] Assignee: The Standard Oil Company, Cleveland, Ohio

[21] Appl. No.: 717,935

[22] Filed: Aug. 26, 1976

[51] Int. Cl.² .............................................. B29C 17/03
[52] U.S. Cl. .................................. 425/298; 425/302.1; 425/398; 425/388
[58] Field of Search .................... 425/388, 398, 302 R, 425/289, 298

[56] References Cited

U.S. PATENT DOCUMENTS

| | | | |
|---|---|---|---|
| 3,342,914 | 9/1967 | Edwards | 425/388 X |
| 3,510,913 | 5/1970 | Edwards | 425/398 X |
| 3,770,860 | 11/1973 | Amberg et al. | 425/388 X |
| 3,964,237 | 6/1976 | Johansen | 425/388 X |

Primary Examiner—Robert L. Spicer, Jr,
Attorney, Agent, or Firm—John F. Jones; Larry W. Evans

[57] ABSTRACT

An apparatus and process for producing hollow articles of thermoplastic sheeting material having large L/D ratios are described.

4 Claims, 6 Drawing Figures

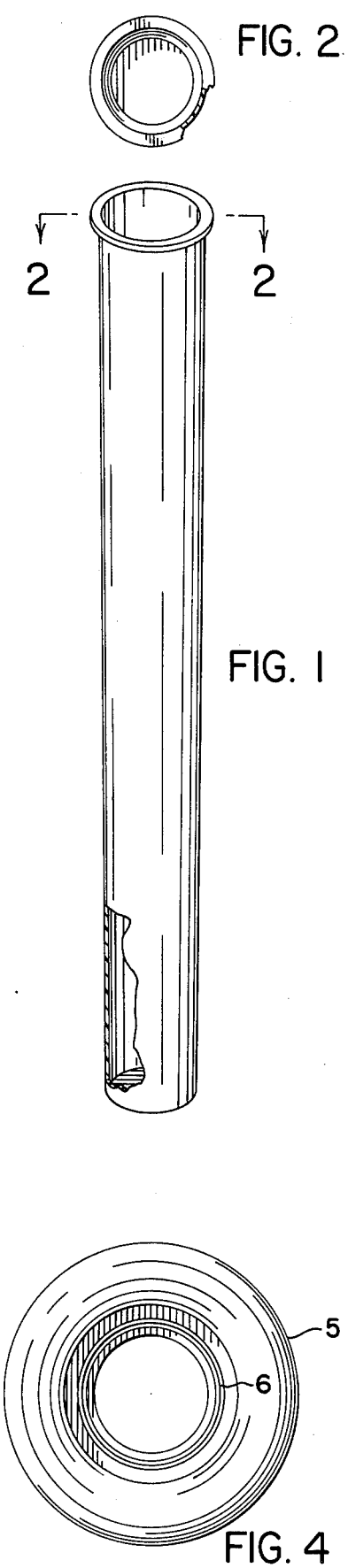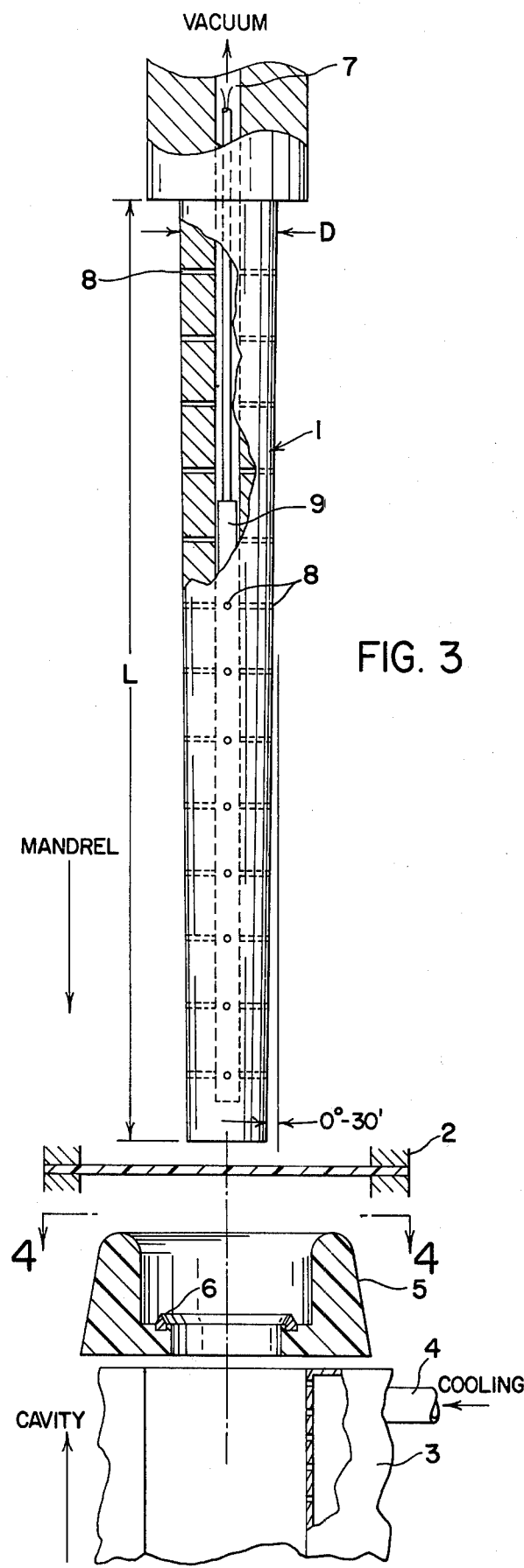

DEEP-DRAW THERMOFORMING OF THERMOPLASTIC SHEET

This invention relates to an apparatus and method for manufacturing hollow articles from thermoplastic sheeting material and more particularly pertains to an apparatus and process for the deep drawing of hollow articles from thermoplastic sheeting materials.

In accordance with this invention, hollow articles of thermoplastic sheeting material with large draw and large L/D (length to diameter) ratios can be obtained by employing our apparatus and process which are more fully described below.

In the deep drawing of thermoplastic sheet material to form hollow articles such as parisons, preforms, liners, and the like, it is customary to first heat the thermoplastic sheet material to a temperature above the heat-distortion temperature and then stretch the thermoplastic material over a mandrel or to pull the thermoplastic material into a deep female mold by means of a vacuum. In either case, the stretched thermoplastic material becomes thinner as it stretches to conform to the shape of the mandrel or the mold, and there is a strong tendency for the thermoplastic material to form wrinkles (particularly at the top) as it is drawn from the softened sheet to conform to the mold.

We have discovered an apparatus and process for thermoforming hollow articles requiring L/D ratios of up to 20/1. By forming a heated thermoplastic sheet around a heated tapered mandrel which can be manifolded with vacuum assist using a domed guide (type of plug assist) larger in diameter than the mandrel, deep-drawn hollow articles having uniform internal diameter (ID), wall thickness and free of wrinkles can be manufactured. In our apparatus and process, the heated mandrel travels into a mold cavity drawing the heated thermoplastic sheet material between the mold cavity and the mandrel. In our apparatus and process, a domed or tapered cavity guide (smooth cavity), larger in internal diameter than the outside diameter (OD) of the mandrel, said domed guide being located just above the mold cavity, maintains uniform draw onto the mandrel and into the mold cavity of the heated plastic from outlying areas of the heated plastic sheet. The domed cavity guide part of the mold cavity has two major functions. First, the draw ratio of the hollow article can be varied by changing the internal diameter of the domed cavity guide. Guide internal diameter dictates the area from which plastic material will be drawn onto the mandrel from the plastic sheet. Secondly, the guide prevents uneven draw and wrinkling of large L/D hollow articles. Hollow articles with extremely small draft angles (less than 30 minutes) can be produced through careful selection of guide diameter and cavity shape. Normally, the vacuum-assisted mandrel travels through the dome cavity guide and into the mold cavity drawing thermoplastic sheet between the guide, the mold cavity and the mandrel.

The apparatus of our invention is further illustrated in the accompanying drawings wherein:

FIG. 1 is a perspective view, partly in section, of a finished hollow thermoplastic article prepared according to this invention.

FIG. 2 is a view taken along line 2-2 in FIG. 1.

FIG. 3 is a side elevation view, partly in section, of the apparatus.

FIG. 4 is a view taken along line 4-4 of FIG. 3.

Figure 5:
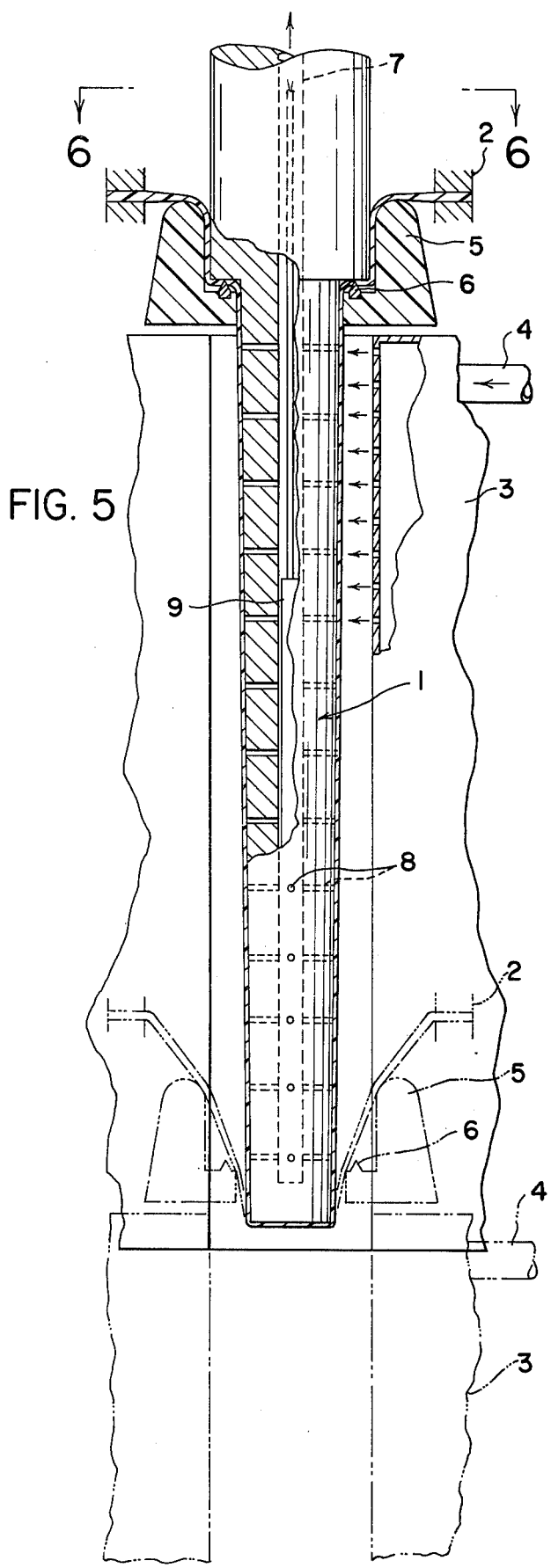
FIG. 5 is a side elevation view, partly in section, and phantom showing the manner in which the thermoplastic sheet material is drawn between the mandrel and the walls of the cavities.
Figure 6:
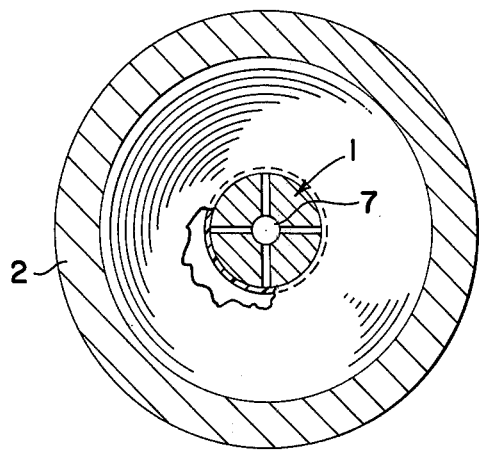
FIG. 6 is a view taken along line 6-6 in FIG. 5.

The apparatus comprises a mandrel or plug assist 1, a holder 2 for the plastic sheet material, a mold cavity 3 having cooling means 4, and at the top of the cavity 3 is located a domed cavity guide 5 having a rounded top and smooth sides. The domed cavity guide 5 can have tapered inner walls which are greater in diameter than the internal diameter of the mold cavity 3 and is usually constructed of a plastic material such as polypropylene, high density polyethylene, polytetrafluoroethylene, nylon, or other materials which have a tendency to resist the transfer of heat from the hot plastic sheet material to the inner walls of the domed cavity guide. The domed guide 5 usually contains at the base thereof and close to the entrance to the mold cavity 3 a hardened metal insert cutter 6. The holder 2 which is located directly above the domed cavity guide 5 is wider than the domed cavity guide 5 and is used to grip the plastic sheet material.

The center of the mandrel 1 is usually equipped with a vacuum line 7 through which air may be evacuated or blown (to release the hollow article after it has been molded and cooled), and this line communicates with openings 8 in the outer wall of the mandrel 1 located along the length of the mandrel 1. The vacuum line 7 is associated within the mandrel 1 with a heater 9 for heating the mandrel 1. Although the mandrel 1 shown in FIG. 1 shows a draft angle as little as zero degrees to 30 minutes, it is to be understood that mandrels having higher draft angles are within the scope of this invention. In the operation of our apparatus when the plastic material to be drawn has been completely drawn from the area within the holder 2 and the mold is completely closed as shown in the upper portion of FIG. 5, the plastic material from the sheet is severed by the cutter 6.

The deep-drawn uniform wall thickness thermoplastic hollow articles produced on the apparatus of this invention are useful, per se, as containers or they can be used as preforms, parisons or liners in the production of plastic bottles by further molding and blowing.

Thermoplastic sheet useful in preparing the hollow articles of this invention can be of any of the well known thermoplastic materials such as the polyolefins, polyvinyl halides including polyvinyl chloride, vinyl chloride copolymers, polyacrylates and copolymers, polymethacrylates and copolymers, polystyrene and copolymers, acrylonitrile copolymers, ABS resins, polycarbonates, polyesters, and the like, and many others.

We claim:

1. In an apparatus for deep drawing of hollow articles from heated thermoplastic sheet comprising a heated mandrel and a mold cavity, means for securing the heated thermoplastic sheet in a position between the mandrel and mold cavity and means for moving the mandrel through the heated thermoplastic sheet so as to draw the heated thermoplastic onto the walls of the mandrel and into the mold cavity, the improvement comprising locating a domed guide located directly above and at the top of the mold cavity, said domed guide having internal walls which are greater in diameter than the internal diameter of the mold cavity and said domed guide being equipped with a hardened metal insert cutter located near the entrance to the mold cavity.

2. The apparatus of claim 1 wherein the means for securing the heated thermoplastic sheet is a holder which is located above the domed guide, said holder being wider than the domed guide.

3. The apparatus of claim 2 wherein the mandrel and mold cavity are tapered in a complementary manner.

4. The apparatus of claim 3 wherein the mandrel is equipped with an internal vacuum line communicating with openings in the wall of said mandrel through which air may be evacuated or blown.

* * * * *